(12) United States Patent
Kaufmann et al.

(10) Patent No.: US 9,108,137 B2
(45) Date of Patent: Aug. 18, 2015

(54) FILTER ARRANGEMENT AND METHOD FOR PRODUCING A FILTER RECEPTACLE

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/011,854

(22) Filed: Aug. 28, 2013

(65) Prior Publication Data

US 2014/0059986 A1 Mar. 6, 2014

(30) Foreign Application Priority Data

Aug. 28, 2012 (DE) .......................... 10 2012 016 955

(51) Int. Cl.
*B01D 46/24* (2006.01)
*B01D 46/00* (2006.01)
*B01D 46/52* (2006.01)

(52) U.S. Cl.
CPC ........ *B01D 46/2403* (2013.01); *B01D 46/0002* (2013.01); *B01D 46/0041* (2013.01); *B01D 46/0046* (2013.01); *B01D 46/2411* (2013.01); *B01D 46/522* (2013.01); *B01D 2265/04* (2013.01); *Y10T 156/10* (2015.01)

(58) Field of Classification Search
CPC ........ B01D 46/02; B01D 46/10; B01D 46/41; B01D 46/46; B01D 46/403; B01D 46/522; B01D 46/2411; B01D 2265/04
USPC ................ 55/495, 385.3, 392, 399, 418–419, 55/434.2, 437, 457, 497; 96/147, 223, 96/324; 156/60; 123/198 E; 95/272
See application file for complete search history.

(56) References Cited

U.S. PATENT DOCUMENTS

2007/0251392 A1* 11/2007 Tschech et al. ................. 96/147
2008/0011259 A1* 1/2008 Madeira .................... 123/184.61

FOREIGN PATENT DOCUMENTS

| DE | 1865519 U | 1/1963 |
|---|---|---|
| DE | 202006011026 U1 | 12/2007 |
| EP | 1364696 A1 | 11/2003 |
| WO | 2012034664 A1 | 3/2012 |

* cited by examiner

*Primary Examiner* — Jason M Greene
*Assistant Examiner* — Karla Hawkins
(74) *Attorney, Agent, or Firm* — James Hasselbeck

(57) ABSTRACT

A filter arrangement has a filter receptacle and a round filter element arranged in the filter receptacle. The filter receptacle has a substantially cylindrical housing part with a cylindrical wall. An inflow opening is arranged in the cylindrical wall. An inflow socket is connected to the inflow opening and adapted to couple a fluid supply line. An axial outflow opening is connected to the cylindrical housing part. The inflow socket has a flow cross-section that widens in a flow direction into an interior of the cylindrical housing part.

12 Claims, 5 Drawing Sheets

FILTER ARRANGEMENT AND METHOD FOR PRODUCING A FILTER RECEPTACLE

CROSS REFERENCE TO RELATED APPLICATIONS

This application claims a priority date of Aug. 28, 2012, based on prior filed German patent application No. 10 2012 016 955.8, the entire contents of the aforesaid German patent application being incorporated herein by reference.

BACKGROUND OF THE INVENTION

The invention concerns a filter arrangement and a method for producing a filter receptacle. Filter elements are disposed in a filter receptacle or in a filter housing so that, as a whole, a filter system or filter arrangement is provided.

In the automotive field, in particular round air filters are known in which a substantially cylindrical housing receives one or more filter elements comprising a filter medium. Fluid to be filtered, in particular contaminated combustion air, flows radially through the filter medium from the interior to the exterior or from the exterior to the interior through a filter medium and is then supplied to the internal combustion engine. In connection with such filter arrangements, it is desirable to keep the flow resistance minimal. At the same time, the mounting space that is determined substantially by the diameter of the cylindrical housing should be as small as possible. In order to satisfy the requirements with respect to a contaminant-free combustion air, multi-stage filter arrangements have been used also in which, for example, a cyclone preseparation is integrated into the housing. Such measures limit the geometry and mounting orientation of the corresponding filter housings and filter arrangements.

SUMMARY OF THE INVENTION

It is therefore an object of the present invention to provide alternative or improved filter arrangements which can be produced in a simple way.

In accordance with the present invention, this is achieved with a filter arrangement comprising a filter receptacle and a filter element, in particular a round filter element, that is arranged in the filter receptacle. The filter receptacle comprises a housing with a substantially cylindrical housing part having a cylindrical wall, an inflow opening that is arranged in the cylindrical wall, an inflow socket that is connected to the inflow opening for coupling a fluid supply line, and an outflow opening, in particular arranged axially, wherein the inflow socket preferably has a flow cross-section that widens in the flow direction.

The flow cross-section increases in particular in the flow direction which can be extending in radial direction relative to a cylindrical housing shape. A changing flow cross-section at the inflow socket, for example, widening toward the interior of the housing, causes a reduced flow resistance of the raw fluid, for example, air containing dust.

In embodiments of the filter receptacle, the inflow socket is welded (fused) to the housing. In conventional filter arrangements or filter receptacles, the inflow socket is often manufactured as an integral part of the housing. By separately configuring the inflow socket and the housing, for example, as shaped plastic parts, a more flexible manufacture is possible. Moreover, the shape of the inflow socket can be adapted flexibly, for example, conically tapering, to the respective mounting or operating situation of the filter. The separate configuration of inflow socket and housing simplifies moreover storage of semi-finished parts. Also, the inflow socket even with complex geometries can be attached simply to the housing. For example, the inflow socket can be welded (fused), glued or connected by means of other known measures to the housing.

In one embodiments of the filter receptacle, the filter receptacle is embodied as a multi-part housing for receiving at least one filter element that is substantially of rotational symmetry. Rotation-symmetrical filter elements are, for example, embodied as endless bellows. Filter receptacle axis and filter element axis are then oriented coaxially to each other. For example, a multi-part housing in the form of a cylinder with terminal sides and a cylindrical housing wall is provided. Moreover, a raw air socket can be coaxially arranged so that upon operation fluid passes substantially from the exterior to the interior radially through the appropriate filter element and is purified. The housing can be designed to provide a cyclone preseparation action. A terminal side of the housing is, for example, designed as a housing cover with closure means.

In embodiments of the filter receptacle, a flow cross-section in a transition area between the inflow socket and the housing is greater than at a distal coupling area of the inflow socket for connecting the fluid supply line. Accordingly, the flow cross-section of the inflow socket widens in the direction toward the interior of the housing. For example, a conical geometry of the inflow socket can be realized. A cross-section that widens in the direction toward the interior has the advantage that the pressure loss during inflow is reduced.

The inflow socket extends preferably substantially outside of the filter receptacle and the distal coupling area has a circular cross-section. For example, supply lines, hoses, or tubes can be coupled easily with the inflow socket.

In embodiments of the filter receptacle, the filter receptacle has a substantially cylindrical housing part with a cylindrical wall and the inflow socket is provided tangentially at the cylindrical wall. In this context, for example, raw air flows tangentially, i.e., at an angle of about approximately 90 degrees to the radial direction, into the filter receptacle and flows in a circular or swirl shape between the inner side of the cylindrical wall and a filter element. Accordingly, a centrifugal separation can be achieved. This is also referred to as a cyclone prefiltration. In combination with a cross-section of the inflow socket that widens toward the interior an even better degree of pre-separation can be achieved.

In embodiments, the inflow socket has a fastening surface which is attached on an exterior side of the housing and overlaps the inflow opening. For example, the inflow socket can comprise a plate with a sleeve-shaped channel that projects away from the plate. The inflow opening can be in particular angularly or irregularly shaped and is overlapped by the plate or the cover surface. It is easy to provide, for example, in pre-manufactured housing parts, an appropriate opening which is then covered or overlapped by the pre-manufactured inflow socket.

Advantageously, the inflow opening is mirror-symmetrical to a plane that extends through the central axis of a housing of in particular hollow cylindrical shape and/or the central axis of the filter element. Accordingly, an inflow socket for tangential inflow provided with a fastening surface in a corresponding shape can be mounted in two directions, respectively, so that, depending on the application, a tangential inflow in clockwise or counterclockwise direction can be realized.

In embodiments of the filter receptacle, the filter receptacle comprises exclusively a first shaped plastic part as a housing part, a second shaped plastic part as a housing cover, fixation means for attachment of the housing cover on the housing part, and a third shaped plastic part as an inflow socket. As fixation means, for example, snap-on elements, locking means, bayonet closures, screw connections or the like are possible.

In embodiments of the filter receptacle, the inflow socket has a flow guiding section that projects into the interior of the housing. The flow guiding section, for example, causes a swirling inflow, or particularly beneficial inflow, at the filter element provided in the housing.

In a preferred embodiment, the flow guiding section substantially extends up to the filter element or an inflow protection that in particular annularly surrounds the filter element. In this context, the end or the terminal edge of the flow guiding section is furthermore preferably less than 1 cm, especially preferred less than 0.5 cm, spaced from the outer surface of the filter element or the inflow protection. The inflow protection can be in particular embodied as a cylindrical or sleeve-shaped frame that is arranged on the housing and that surrounds the filter element or, alternatively, is part of the filter element. The flow guiding section that projects up to the filter element or the inflow protection provides the advantage that a tangential inflow is transformed uniformly into a rotating flow.

Moreover, a filter arrangement comprising a filter receptacle which comprises a housing that has an inflow opening and an inflow socket attached to the inflow opening for coupling a fluid supply line thereto is proposed. In this context, the inflow socket has a flow cross-section which changes in the flow direction. The filter arrangement comprises also a filter element arranged in the filter receptacle which has a substantially cylindrical endless bellows with a zigzag-shaped folded filter medium.

The filter element can have in particular a cylindrical endless bellows wherein the filter medium has alternating fold sections of different width. Accordingly, alternatingly inner fold edges, which are arranged on an inner circumferential line, and outer fold edges, which are arranged on an outer circumferential line are formed. Since the fold sections of different width are alternatingly arranged, a kind of sawtooth folding is provided and inflow pockets on a cylinder wall are provided that are slanted relative to the radial direction. Accordingly, this filter arrangement in combination with an appropriately designed filter element makes use of a swirl flow being created, for example by tangential inflow of the air into the intermediate space between filter element and outer wall of the housing, and also of an easy inflow of the fluid to be filtered or the raw air into the slanted filter pockets of the sawtooth folding.

Also, a method for producing a filter receptacle is proposed. In this connection, in particular a filter receptacle and/or a filter arrangement as described above is produced. The method comprises:
providing a housing,
producing an inflow opening in the housing, and
attaching, in particular by welding (fusing), an inflow socket to the inflow opening.

The inflow opening can be, for example, stamped, cut or milled into the housing. The method provides an efficient sequence of method steps because, for example, a standard housing in the form of a cylinder with a cylinder wall is pre-stocked and, depending on use and application of the filter receptacle, an appropriately matched inflow socket is attached to the opening. The attachment or fastening is done in particular by welding (fusing) but can also be done by gluing or other fastening methods.

Further possible implementations of the invention comprise also combinations, not explicitly mentioned, of features or variants described above or in the following with regard to embodiments. In this connection, a person skilled in the art will also consider individual aspects as improvements or supplements to the respective basic form of the invention.

Further embodiments of the invention are the subject matter of the dependent claims as well as of the embodiments disclosed in the following. In the following, the invention will be explained in more detail based on the illustrated embodiments with reference to the attached drawings.

BRIEF DESCRIPTION OF THE DRAWINGS

In the Figures, same reference characters identify same or functionally the same elements, if nothing to the contrary is indicated.

DESCRIPTION OF PREFERRED EMBODIMENTS

Figure 1:
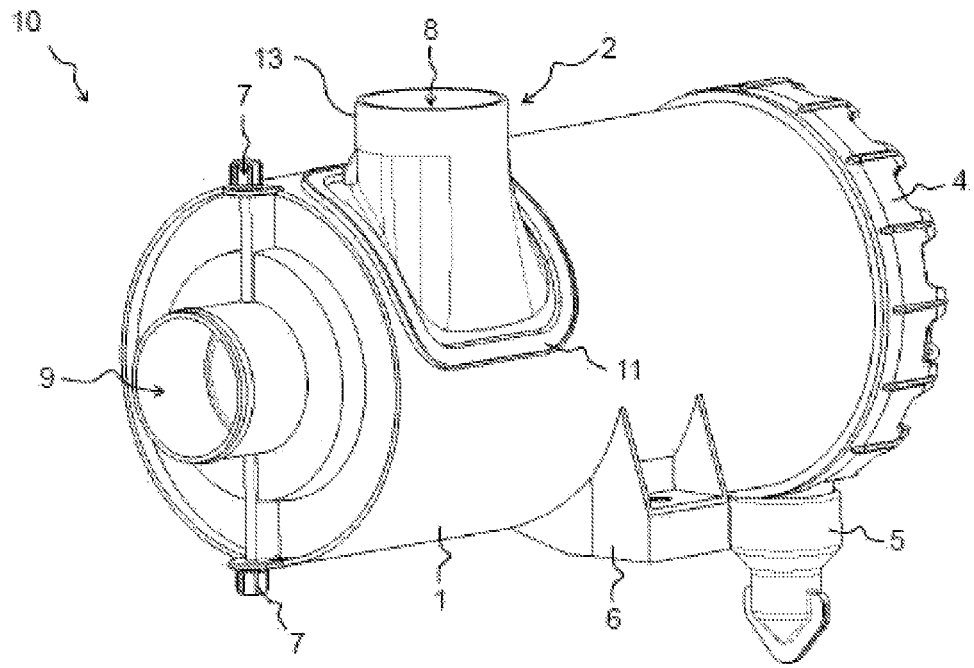
FIG. 1 shows in a perspective view a first embodiment of a filter receptacle and filter arrangement.
Figure 2:
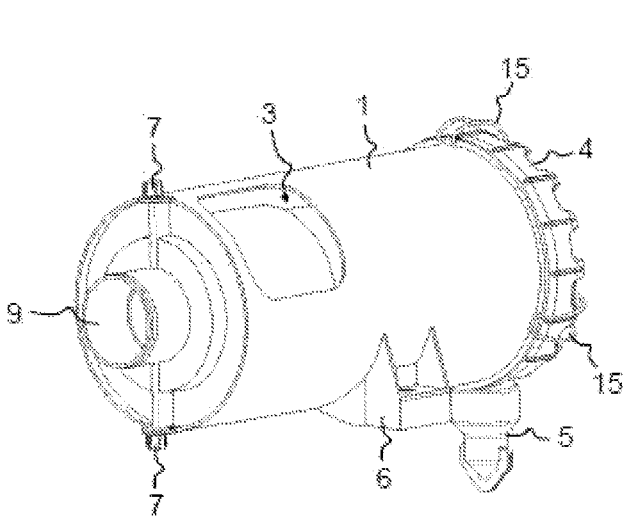
FIG. 2 shows in a perspective view a housing part of the filter arrangement according to FIG. 1.
Figure 3:
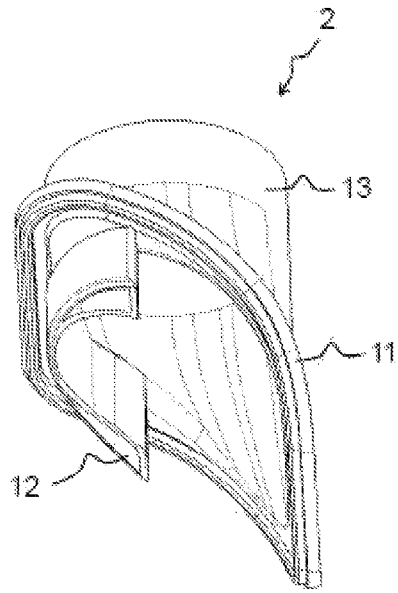
FIG. 3 is a perspective view of an inflow socket of the filter arrangement according to FIG. 1.
Figure 4:
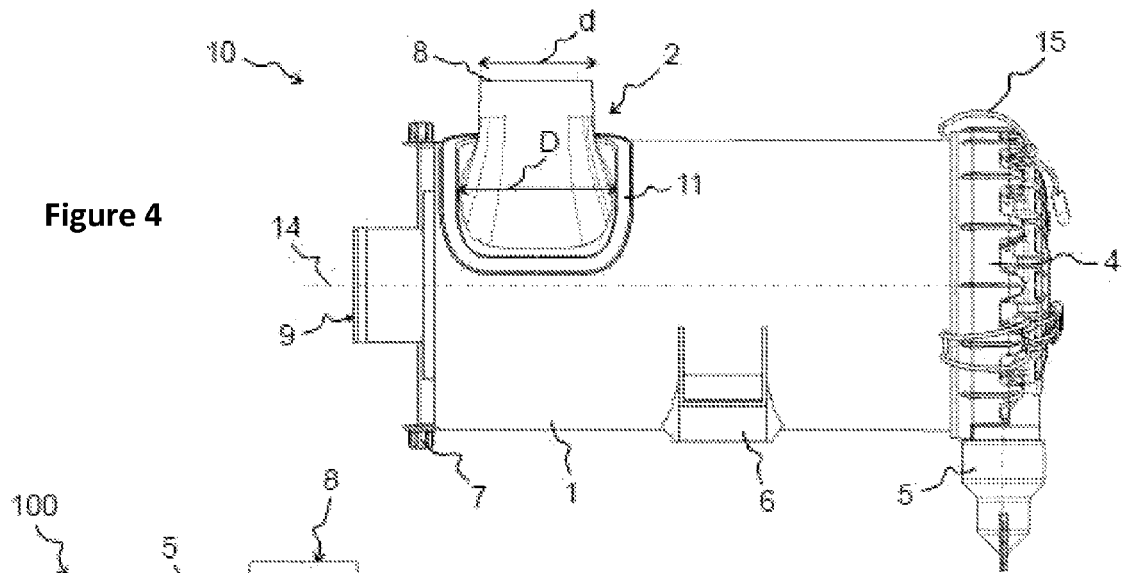
FIG. 4 shows a side view of the filter arrangement according to FIG. 1.
Figure 5:
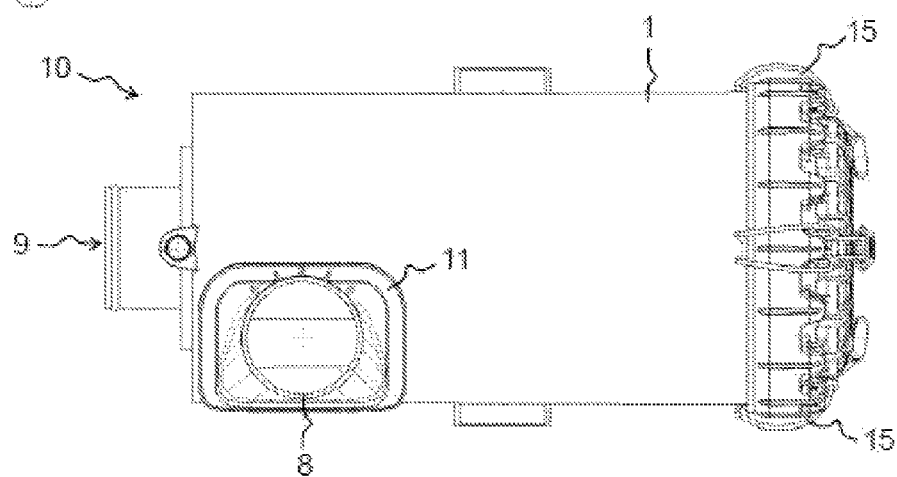
FIG. 5 shows another side view of the filter arrangement according to FIG. 1.
Figure 7:
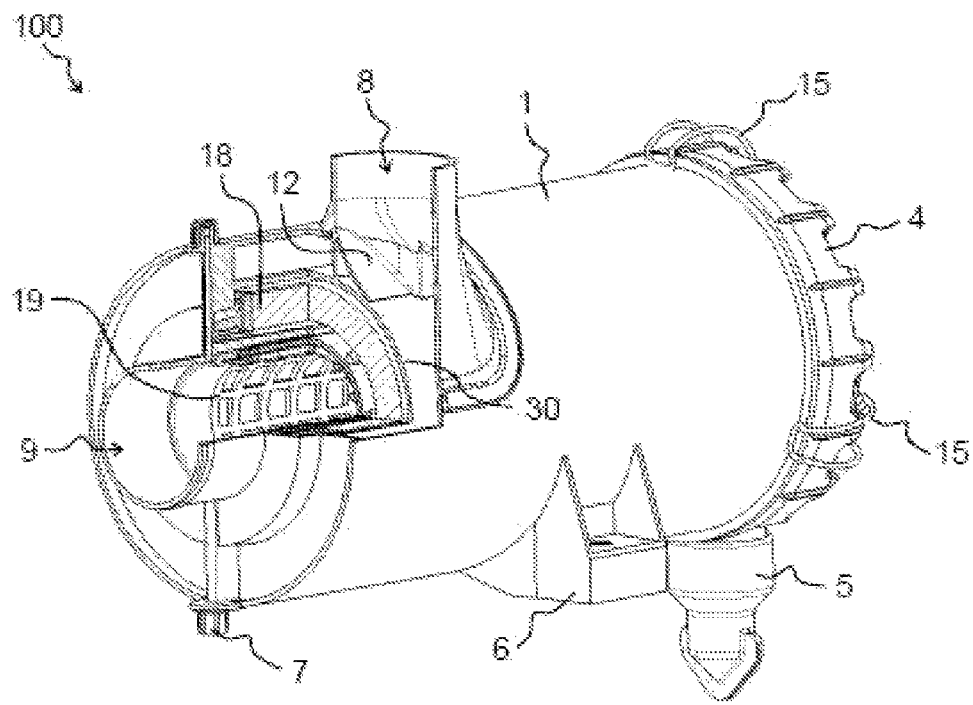
FIG. 7 shows a perspective illustration of the filter arrangement according to FIG. 1, partially broken away.

FIG. 1 shows a perspective view of a first embodiment of a filter arrangement and a filter receptacle. In FIGS. 2 and 3, perspective illustrations of housing parts such as filter housing and filter cover as well as an individual inflow socket are illustrated. FIGS. 4 and 5 shows side views of the filter receptacle, and FIG. 7 shows a partially broken-away perspective illustration of a corresponding filter arrangement with inserted filter element.

FIG. 1 shows perspectively the filter receptacle 10. The filter receptacle 10 is comprised of a substantially cylindrical housing part 1 and a housing cover 4. The housing parts 1, 4 are, for example, shaped plastic parts and can be produced by an injection molding process or by other known manufacturing processes. On the exterior side of the housing part 1 an inflow socket 2 is attached. The inflow socket 2 comprises a cylinder section 13 projecting away from a fastening surface 11 and away from the housing part 1. Raw air enters through connecting opening 8 on the inflow socket 2 and clean air is removed through the outflow opening 9. Together with the filter element provided in the housing 1, a filter arrangement or a filter system is provided.

FIG. 3 shows the curved fastening surface 11 which follows snugly the contour of the surface of the housing part 1 and is fastened, for example, by means of welding, to this surface of the housing part 1. Furthermore, a flow guiding section 12 passes through the inflow opening 3 in the housing part 1 into the interior of the housing part 1.

FIG. 2 shows the housing part 1 without inflow socket. On the housing part 1, there are fastening sections 6 and 7 that serve for attaching the housing part 1 or the entire filter receptacle 10 to a vehicle. The housing part 1 is embodied like a cylinder with cover surfaces, wherein one cover surface is formed by the housing cover 4. The housing cover 4 is connected by means of clips 15 with the cylinder wall of the cylindrical housing part 1.

In the orientation of FIG. 1, to the left and facing the viewer, there is an outflow opening 9 for filtered fluid. Upon operation of the filter arrangement embodied as a round air filter, raw fluid, for example, in the form of dust-laden air, flows through the connecting opening 8 on the inflow socket 2 into the interior of the housing part 1, passes radially through a filter medium, and exits the filter arrangement as purified fluid along the longitudinal axis 14 of the filter housing part 1 or of the filter receptacle 10.

Figure 6:
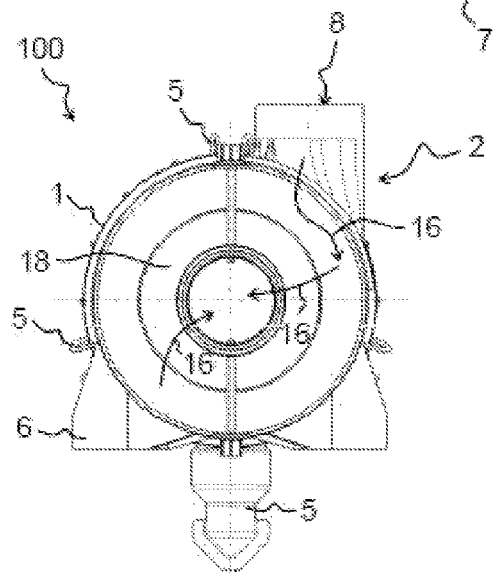
FIG. 6 shows a cross-sectional view of the filter arrangement according to FIG. 1.

In FIG. 6, a cross-sectional view perpendicular to the longitudinal axis 14 of the filter arrangement with a filter receptacle, as shown in FIG. 1, is illustrated with inserted filter element 18. The inflow socket 2 is attached such to the cylindrical wall of the housing part 1 that first raw air enters tangentially into the intermediate space between the cylinder-shaped filter element 18 and the housing wall. The filter element 18 can be, for example, embodied as an endless bellows with zigzag-shaped folded filter medium, for example, a filter nonwoven or filter paper. The raw air to be cleaned is guided, in the orientation of FIG. 6, in clockwise direction along the inner wall of the housing part 1 so that as a result of the produced centrifugal forces coarse dust particles are forced against the inner wall. The flow is indicated by arrows 16. Accordingly, a preseparation in the manner of a centrifugal separator is carried out and the separated particles collect in the lower area of the filter housing part 1. In order to be able to remove the collected dust, a dust removal device 5 is provided.

Moreover, as a result of the pressure differences a flow of the filter element 18 substantially from the exterior to the interior in radial direction takes place. This is also indicated by arrows 16. Along the longitudinal axis 14 the purified fluid can then be supplied through the outflow opening 9 to an internal combustion engine, for example.

In FIG. 7, a partially broken-away perspective illustration of the filter arrangement 100 comprised of a housing part 1 and a suitable filter element 18 is illustrated. When looking also in particular at FIG. 4, it is apparent that the inflow socket 2 has a circular connecting opening 8, for example, for an air connecting hose that has a reduced diameter d in comparison to the transition area to the housing part 1. The transition area is to be understood as the area of the inflow socket 2 that adjoins snugly the rim of the inlet opening 3 of the housing part 1. Accordingly, a greater outflow cross-section with a diameter D relative to the interior of the housing part 1 in comparison to the connector 8 of the socket (d<D) is provided. As a result of the widening of the flow cross-section, a reduced pressure loss upon inflow of the raw fluid into the interior of the filter arrangement 100 results.

In FIG. 7, a configuration of a filter arrangement 100 is illustrated that comprises several filter elements. As indicated in FIG. 6, a main element 18 is fitted cylindrically into the interior of the housing part 1. For securing the cylindrical primary or main filter element 18, a cylindrical or sleeve-shaped frame 30 is provided into which the head of the filter element 18 is inserted. Accordingly, an intermediate space between the frame 30 and the inner wall of the housing part 1 results. On the inflow socket 2 there is additionally a flow guiding section 12 that is extending in the direction toward the frame 30. In this way, a particularly beneficial inflow and flow about the frame 30 by the raw air is provided in clockwise direction in the orientation of FIG. 7. In order to improve the filter performance further, within the cylindrical main filter element 18 a secondary element is provided that engages with its inner side a support body 19. The support body 19 is fluid-permeable or air-permeable and serves as a support and securing means for the filter medium arranged about it.

Finally, the purified fluid or the clean air flows through the outflow opening 9 along the longitudinal axis 14 out of the filter arrangement 100. By means of the widening inflow socket 8, a reduced flow resistance relative to cylindrical sockets is provided upon inflow of the raw air into the filter arrangement. Moreover, the inflow socket, due to the separate embodiment of filter housing part 1 and inflow socket 2, can be adjusted flexibly.

When producing the filter receptacle, first the filter housing is pre-stocked, then provided with an opening, for example by stamping or cutting, and then the inflow socket is connected with its fastening surface 11 to the opening by welding.

With the tangential arrangement of the inflow socket, i.e., at an angle to the radial direction of the cylindrical filter system, excellent flow and purification of fluid are obtained even for single-stage filters. The cylinder-shaped housing part 1 can be produced as a shaped plastic part so that welding on the housing wall can be eliminated. As such, the manufacture of the entire filter arrangement is simplified.

Figure 8:
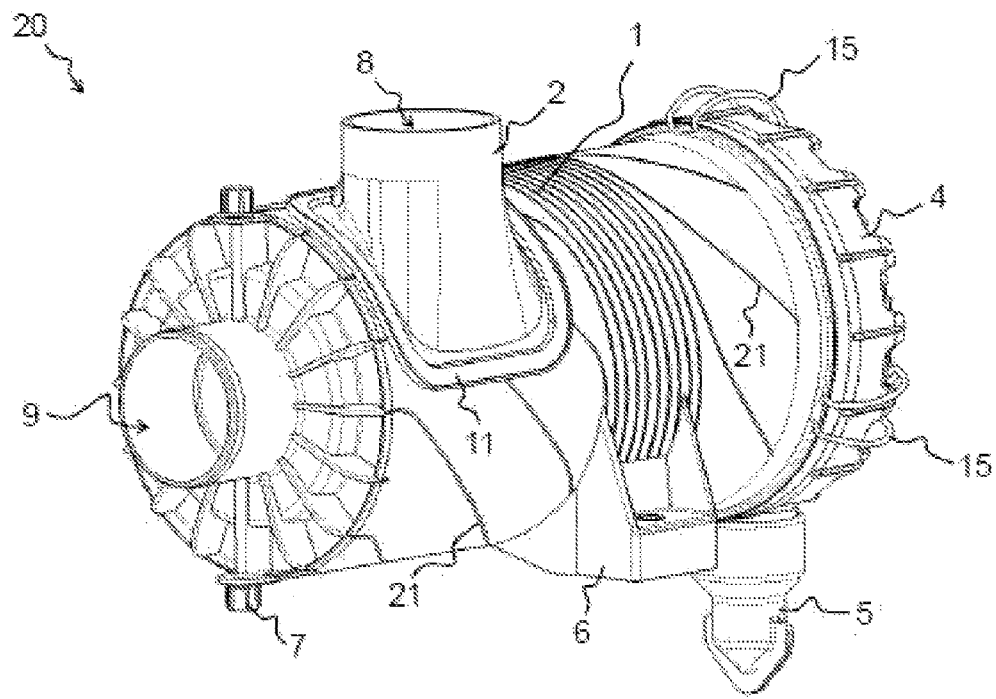
FIG. 8 shows a perspective view of a second embodiment of the filter arrangement and filter receptacle.
Figure 9:
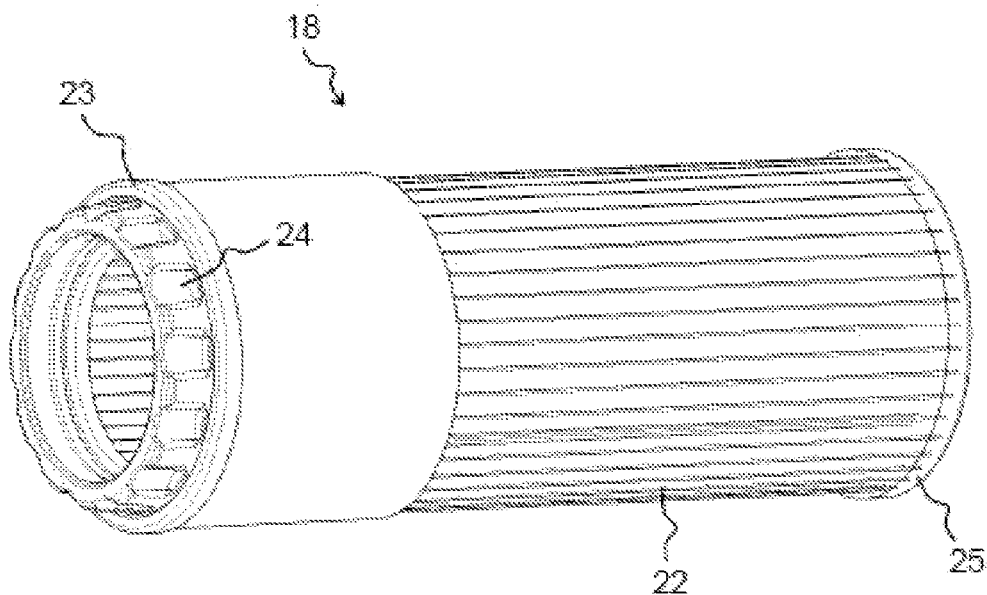
FIG. 9 is a perspective illustration of an embodiment of a filter element for use in a filter arrangement.

FIGS. 8-12 show various illustrations of a second embodiment of a filter arrangement and its components. In FIG. 8 a perspective illustration of a filter arrangement or filter receptacle 20 is illustrated. In this connection, a cylindrical housing part 1 is provided which in the orientation of FIG. 8 at the rear is closed by a housing cover 4 which is connected by means of clamps or tightening elements 15 to the cylinder head. In the orientation of FIG. 9, the front end of the housing part 1 is provided with the outflow opening 9. An inflow socket 2 which widens in the direction toward the interior of the housing part 1 is welded or fused by means of the fastening surface 11 to the housing part 1. Because of the inflow socket 2 or its connecting opening 8, the raw air flows into the interior of the housing part 1 and is filtered therein by means of an endless bellows and is released as clean air through the exit opening 9.

FIG. 8 shows moreover reinforcement ribs 21 of the housing part 1 and a dust removal device 5 in order to remove the particles that have collected as a result of the cyclone prefiltration stage. The inflow socket 2 is tangentially connected to the cylindrical wall of the cylindrical housing part 1 so that the raw fluid first flows in clockwise direction in the housing part 1 (in the orientation of FIG. 8). In the interior of the housing part 1, a zigzag-shaped endless bellows as a filter element is inserted.

Figure 10:
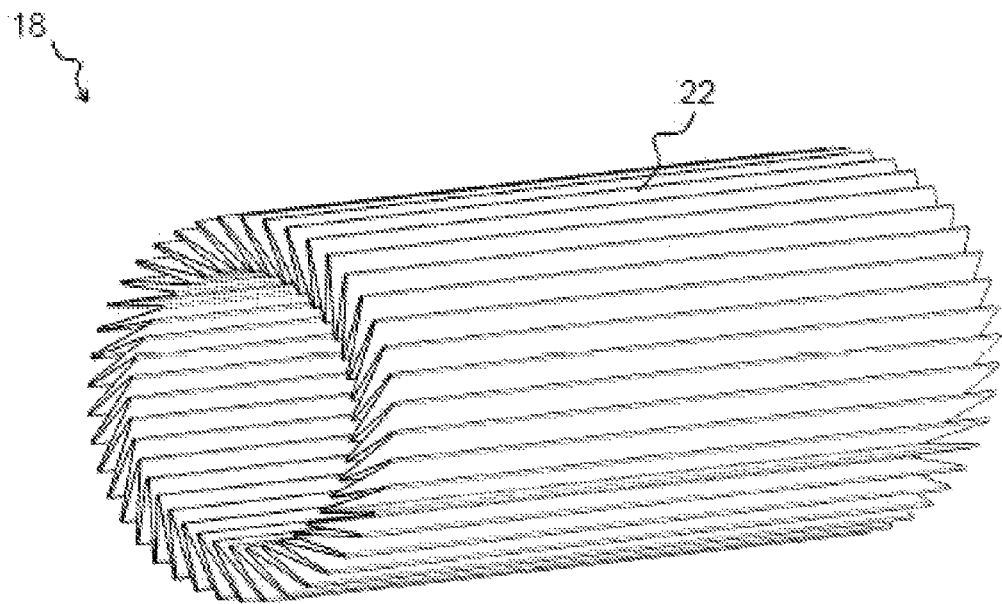
FIG. 10 is a perspective illustration of another embodiment of the filter element for use in a filter arrangement.

In FIGS. 9 and 10 details of the filter element 18 are illustrated. In FIG. 10 an endless bellows of zigzag-shaped folded flat filter material, for example, a filter nonwoven, is indicated. On the end faces of the endless bellows 22, as illustrated in FIG. 10, end disks are arranged (compare FIG. 9). A rearward end disk 25 stabilizes the fold edges and is welded or glued to the folds. In the orientation of FIG. 9 to the left, a coupling ring 23 is provided which surrounds the folds. Moreover, the coupling ring 23 is provided with recesses 24 as an anti-rotation device. In the mounted state as illustrated in FIG. 11, the recesses 24 are pressed against corresponding ribs on the left-side end of the housing part 1 so that the filter element is secured fixedly.

Figure 11:
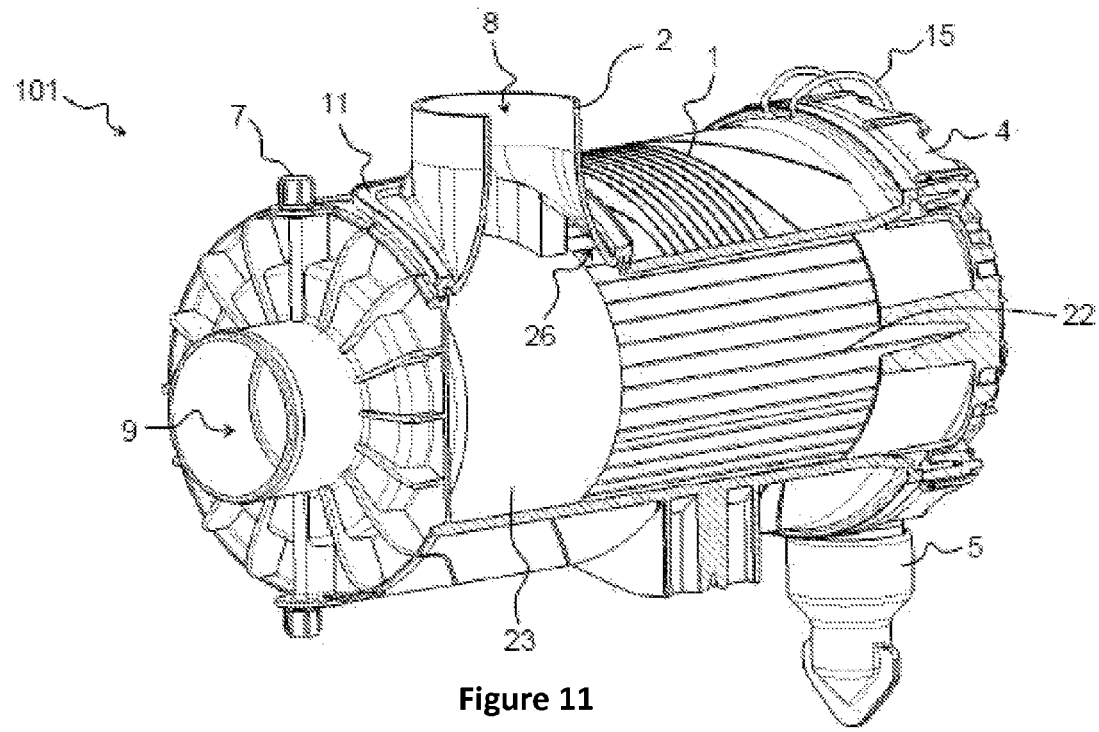
FIG. 11 is a perspective illustration of the filter arrangement according to FIG. 8, partially broken away.

In the partially broken-away perspective illustration of FIG. 11, it is apparent that in the transition area 26 between inflow socket 2 and housing part 1 the cross-section widens. In this context, the fastening plate or fastening surface 11 of the inflow socket 2 surrounds the corresponding inflow opening in the housing part 1. In order to improve the flow conditions in particular for the incoming flow, i.e., in the intermediate space between the filter element 18 or endless bellows 22 and the inner side of the housing part 1, the bellows has zigzag-shaped sawtooth folds. This means that alternatingly fold sections of different width are provided.

Figure 12:
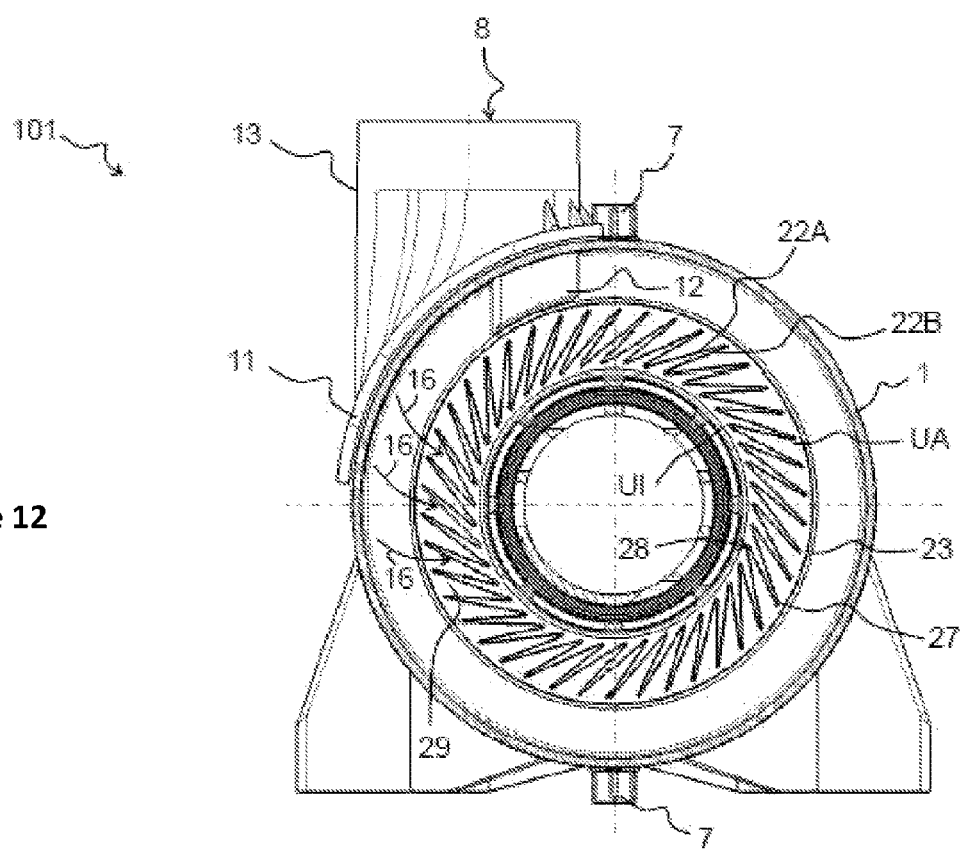
FIG. 12 is a cross-sectional view of the filter arrangement according to FIG. 8.

In the cross-section of FIG. 12, it is apparent that the tangentially incoming air flows first in counterclockwise direction, in the orientation of FIG. 12, along the inner side of the housing part 1 and penetrates into slantedly positioned pockets 29 of the endless bellows 18. The pockets or intermediate spaces between outer fold edges 27 and inner fold edges 28 are identified by reference numeral 29. The alternatingly arranged fold sections 22A, 22B of different width provide a slanted position of the fold valleys or inflow pockets 29. The endless bellows 22 is comprised of wide folds sections 22A and narrow folds sections 22B. In this way, outer fold edges 27 and inner fold edges 28 are provided. The inner fold edges 28 are arranged, viewed in cross-section, on an inner circumferential line UI and the outer fold sections 27 on an outer circumferential line UA. Due to the different fold section widths, the slanted position results; this arrangement can be referred to as a sawtooth fold. This configuration provides that the air that is laden with dust can penetrate directly into the fold pockets 29.

In interaction in particular with a tangentially arranged inflow socket 2, this arrangement results in a rotating air flow about the inner side of the cylindrical wall of the housing part 1 and easier penetration of the air into the endless bellows. Accordingly, improved utilization of the kinetic energy of the incoming air is achieved and thus a reduced pressure loss during filtering is achieved with the aid of the proposed filter arrangements. Also, manufacture is simplified because the inflow socket and the filter housing can be manufactured separately from each other and subsequently can be connected by welding or gluing. In this way, simpler geometries can be realized by injection molding.

While specific embodiments of the invention have been shown and described in detail to illustrate the inventive principles, it will be understood that the invention may be embodied otherwise without departing from such principles.

What is claimed is:

1. A filter arrangement comprising:
a filter receptacle;
a round filter element arranged in the filter receptacle;
wherein the filter receptacle comprises:
   a substantially cylindrical housing part with a circumferential cylindrical outer wall,
   an inflow opening arranged in the cylindrical wall,
   an inflow socket connected to the inflow opening adapted to couple a fluid supply line, and
   an axial outflow opening connected to and secured onto an exterior surface of the cylindrical housing part,
wherein the inflow socket arranged on and secured onto a radially outer circumferential surface of the cylindrical housing part,
wherein the inflow socket defines within an inflow channel having a flow guiding section as a curved wall secured on an interior of the inflow socket, the curve wall arranged within the inflow socket, the curved wall projecting from the inflow socket into an interior of the cylindrical housing,
wherein the flow guiding section extends inwardly from the inflow socket substantially UP to the filter element in the cylindrical housing part,
wherein the flow guiding section curved wall projection covers a portion of the radial exterior of the filter element, causing flow entering the inflow channel to be guided to flow tangentially around the radial exterior of the filter element within an annular intermediate space between the radial exterior of the filter element and an interior surface of the cylindrical wall of the substantially cylindrical housing part.

2. The filter arrangement according to claim 1, wherein the inflow socket has a flow cross-section that widens in a flow direction of a fluid to be filtered.

3. The filter arrangement according to claim 1, wherein the inflow socket is welded or glued to the cylindrical housing part.

4. The filter arrangement according to claim 1, wherein the filter receptacle has a multi-part housing that includes the cylindrical housing part.

5. The filter arrangement according to claim 1, wherein a first flow cross-section in a transition area between the inflow socket and the cylindrical housing part is greater than a second flow cross-section at a coupling area of the inflow socket,
said coupling area positioned distal to the cylindrical housing part.

6. The filter arrangement according to claim 1, wherein the inflow socket is connected tangentially to the cylindrical wall of the cylindrical housing part.

7. The filter arrangement according to claim 1, wherein the inflow socket comprises a fastening surface that is attached to an exterior side of the cylindrical wall of the cylindrical housing part and overlaps the inflow opening.

8. The filter arrangement according to claim 1, wherein the filter receptacle comprises exclusively a first shaped plastic part that is the cylindrical housing part,
a second shaped plastic part that is a housing cover,
fixation means for attachment of the housing cover on the cylindrical housing part, and
a third shaped plastic part that is the inflow socket.

9. The filter arrangement according to claim 1, wherein the filter element has an inflow protection that annularly surrounds the filter element and
wherein the flow guiding section extends substantially to the inflow protection of the filter element.

10. The filter arrangement according to claim 1, wherein the filter element is a substantially cylindrical endless bellows with a zigzag-shaped folded filter medium,
wherein the filter medium has fold sections of different width that are alternatingly arranged such that alternatingly inner fold edges are arranged on an inner circumferential line and outer fold edges are arranged on an outer circumferential line.

11. A method for producing a filter receptacle for a filter arrangement according to claim 1, comprising:
providing a substantially cylindrical housing comprising:
   an inflow opening arranged in and extending through a circumferential cylindrical outer wall of the housing;
   an axial outflow opening connected to and secured onto an exterior surface of the cylindrical housing;

providing an inflow socket configured for mounting onto the circumferential cylindrical outer wall of the housing, the inflow socket having an inflow opening adapted to couple a fluid supply line;

securing the inflow socket to onto an exterior surface of the cylindrical housing such that the inflow socket is aligned on the inflow opening for flow communication;

wherein the inflow socket defines within an inflow channel having a flow guiding section as a curved wall secured on an interior of the inflow socket, the curve wall arranged within the inflow socket, the curved wall projecting from the inflow socket into an interior of the cylindrical housing when mounted to the housing;

wherein the flow guiding section, when mounted, extends inwardly from the inflow socket substantially UP to the filter element in the cylindrical housing;

wherein the flow guiding section curved wall projection is configured to cover a portion of a radial exterior of the filter element to be installed in the housing, causing flow entering the inflow channel to be guided to flow tangentially around the radial exterior of the filter element within an annular intermediate space between the radial exterior of the filter element and an interior surface of the cylindrical wall of the cylindrical housing.

12. The method according to claim 11, comprising:

securing the inflow socket by welding to the housing.

\* \* \* \* \*